(12) United States Patent
Nygren et al.

(10) Patent No.: US 11,317,565 B2
(45) Date of Patent: May 3, 2022

(54) DEVICE FOR SEMI-AUTOMATIC MOVEMENT OF OBJECTS

(71) Applicant: ÅLÖ AB, Umeå (SE)

(72) Inventors: Tomas Nygren, Umeå (SE); Gustaf Lagunoff, Umeå (SE); David Wiberg, Umeå (SE)

(73) Assignee: ÅLÖ AB, Umeå (SE)

(*) Notice: Subject to any disclaimer, the term of this patent is extended or adjusted under 35 U.S.C. 154(b) by 575 days.

(21) Appl. No.: 16/380,085

(22) Filed: Apr. 10, 2019

(65) Prior Publication Data

US 2019/0230865 A1    Aug. 1, 2019

Related U.S. Application Data

(63) Continuation of application No. PCT/SE2017/050990, filed on Oct. 9, 2017.

(30) Foreign Application Priority Data

Oct. 10, 2016  (SE) .................................. 1651328-5

(51) Int. Cl.
*A01D 87/00*    (2006.01)
*B66C 1/68*    (2006.01)
(Continued)

(52) U.S. Cl.
CPC ............ *A01D 87/0076* (2013.01); *B66C 1/68* (2013.01); *B66C 13/16* (2013.01); *B66C 13/48* (2013.01);
(Continued)

(58) Field of Classification Search
CPC ...... A01D 87/0076; B66C 1/68; B66C 13/16; B66C 13/48; B66F 9/0755; B66F 9/20; B66F 9/24; B66F 17/003
See application file for complete search history.

(56) References Cited

U.S. PATENT DOCUMENTS

| | | | |
|---|---|---|---|
| 2004/0083025 A1* | 4/2004 | Yamanouchi | B66F 9/0755 700/213 |
| 2012/0089305 A1 | 4/2012 | Behncke et al. | |
| 2013/0238202 A1* | 9/2013 | Aulton | B66F 9/24 701/50 |

FOREIGN PATENT DOCUMENTS

| | | |
|---|---|---|
| DE | 8012317 U1 | 8/1980 |
| DE | 4138483 A1 | 6/1992 |

(Continued)

OTHER PUBLICATIONS

International Search Report and Written Opinion for PCT/SE2017/050990, dated Dec. 8, 2017, 13 pages.
(Continued)

*Primary Examiner* — Tyler J Lee
*Assistant Examiner* — Yufeng Zhang
(74) *Attorney, Agent, or Firm* — Dinsmore & Shohl LLP

(57) ABSTRACT

The invention relates to an agricultural device for semi-automatic movement of a holding tool, for holding an object, between two positions, said two positions being at different heights. The device comprises said holding tool for holding the object, load sensing means for determining if the holding tool holds an object, driving means (9) for moving the holding tool up and down, a control unit for controlling the driving means, and a user interface for user input to the control unit. The device can be used in two modes of operations, wherein the holding tool in a first mode of operation is freely movably, and in a second mode of operation is semi-automatically movable between a plurality of determined positions (URP, UPP, LRP, LPP) depending on if the holding tool is holding an object or not, and which command is given to the user interface. The invention further relates to an agricultural vehicle comprising such an agricultural device, a method for an agricultural device, for such semi-automatic movement, and software for obtaining (Continued)

information related to driving means, said software being adapted to perform the method according to the invention.

15 Claims, 5 Drawing Sheets

(51) Int. Cl.
  *B66C 13/16* (2006.01)
  *B66C 13/48* (2006.01)
  *B66F 9/20* (2006.01)
  *B66F 9/24* (2006.01)
  *B66F 9/075* (2006.01)
  *B66F 17/00* (2006.01)
(52) U.S. Cl.
  CPC ............... *B66F 9/0755* (2013.01); *B66F 9/20* (2013.01); *B66F 9/24* (2013.01); *B66F 17/003* (2013.01)

(56) References Cited

FOREIGN PATENT DOCUMENTS

| | | |
|---|---|---|
| DE | 102014116049 A1 | 5/2016 |
| EP | 2527288 A1 | 11/2012 |
| EP | 2848575 A1 | 3/2015 |
| EP | 2993155 A1 | 3/2016 |
| EP | 3023382 A1 | 5/2016 |
| GB | 2360500 A | 9/2001 |
| JP | H09194199 A | 7/1997 |

OTHER PUBLICATIONS

Swedish Search Report for Patent Application No. 1651328-5, dated May 23, 2017, 3 pages.

* cited by examiner

DEVICE FOR SEMI-AUTOMATIC MOVEMENT OF OBJECTS

RELATED APPLICATIONS

The present application is a continuation of PCT Application No. PCT/SE2017/050990 filed Oct. 9, 2017, which claims priority to Swedish Application No. SE 1651328-5, filed Oct. 10, 2016, all of which are hereby incorporated in their entirety by reference as set forth herein.

FIELD OF THE INVENTION

The present invention relates to an agricultural device for semi-automatic movement of a holding tool, for holding an object, between two positions, an agricultural vehicle with such a device, and a method for an agricultural device for semi-automatic movement of a holding tool, for holding an object, between two positions.

BACKGROUND OF THE INVENTION

For a lot of industrial applications, and in the technical field of agriculture especially, moving different types of objects around from and to different locations are of the utmost importance. Said objects, which may be produced products or raw materials need to be moved for storage, transportation, displaying or other. For such movement different types of moving devices are available to use, such as front loaders, forklifts and cranes to name a few. In their most basic form such equipment is manually controlled, wherein an operator manually lifts, lowers, moves and positions the object at hand to its desired location. The type of work needed in agricultural applications can rarely be fully automated, as the raw materials are produced on a field rather than an industrial facility. However, different types of semi-automatic machinery may be used. Such a semi-automatic device may have different movement patterns programmed therein, wherein an operator may use a large variety of commands to achieve corresponding large amount of movement operations.

However, as such devices are usually mounted to, or a part of, a vehicle such a tractor, an operator may be distracted from the actual driving of the tractor if the movement patterns and operations are too many or too complex. If the operator is too distracted by the movement operations, he/she may opt to stop the tractor while adjusting the position of the holding tool of the device, which ends up as lost time. Lost time of operation results in a lower production than possible and is hence not a sought after situation. Another scenario for such a case may be that the operator becomes less focused as his/her focus is split between too many working operations at the same time. A split focus of the operator may lead to an increased risk at the workplace and is hence also a detrimental situation for the workplace and/or its employees.

There is therefore a need for an improved device for semi-automatic movement of objects which overcomes the problems of prior art.

SUMMARY OF THE INVENTION

The object of the present invention is to provide an agricultural device for semi-automatic movement of an object between different positions. More specifically the object of the invention is to provide a device which makes such movement easier and more efficient. A further object of the invention is to provide a device which is safer to use for a workplace and its employees. An even further object of the invention is to provide an agricultural vehicle with such a device, and a method for semi-automatic movement with such a device.

These objects are achieved by the device according to claim 1, the vehicle according to claim 13 and the method according to claim 14. Further advantages of the invention are described with reference to the dependent claims.

According to a first aspect of the invention an agricultural device for semi-automatic movement of a holding tool, for holding an object, between two positions, said two positions being at different heights, is provided. The device comprises said holding tool for holding the object, load sensing means for determining if the holding tool holds an object, driving means for moving the holding tool up and down between a lowest point and a highest point, a control unit for controlling the driving means, and a user interface for user input to the control unit. The device can be used in two modes of operations, wherein the holding tool in a first mode of operation is freely movably between the lowest point and the highest point by means of user input via the user interface, and in a second mode of operation is semi-automatically movable between a plurality of determined positions within a range between the lowest and highest point. In the second mode of operation the control unit is arranged to control the driving means for moving the tool in accordance with a predetermined scheme comprising four determined positions, wherein said predetermined scheme comprises; —moving the holding tool to an upper retrieval position, when an up command is received by means of the user interface and the holding tool is not holding an object, —moving the holding tool to an upper placing position, when an up command is received by means of the user interface and the holding tool holds an object, —moving the holding tool to a lower retrieval positon, when a down command is received by means of the user interface and the holding tool is not holding an object, and—moving the holding tool to a lower placing positon, when a down command is received by means of the user interface and the holding tool holds an object.

This has the advantage that a device is provided which may be used for fast and efficient semi-automatic movement of an object between two positions. Such a device may be used for picking up a plurality of objects from one location, wherein the objects are located at the lower retrieval position respectively, and moving them to and placing them on, another location, wherein the objects can be placed at said another location at the upper retrieval position. Such operations may be performed at a wide variety of working environments and situations, such as shelving products in a store, organizing and/or relocating products in a warehouse, or packing objects into a truck for transportation. The present invention is specifically intended to be used for agricultural applications, such as moving bales of harvested crop from a field to some sort of storage facility; however it may be used for a wide variety of purposes as exemplified above. As the device in the second mode of operation automatically moves the driving means to the placing positions if the holding tool is holding an object, and to the retrieval positions if not, only one command is needed to move to the correct position in either the up or down directions. This is beneficial as a user of the device only needs to give a single input to the user interface, being an up or down command, to move to the correct position in height automatically. When used, the device will thereby automatically align with picking up or placing an object without the user of the device giving any input if the device holds and object or not. An even further advantage with the device is that an operator using the device does not need to pay as much attention to the movement of the holding tool as the system is semi-automatic. When the device is used in combination with some sort of transportation means, such as a vehicle, for moving an object between positions also being at a lateral distance from each other, the operator may focus more on operating the transportation means instead. This results in a safe and reliable vehicle comprising such a device, which in turn results in a safer workplace where said device is being used.

According to another aspect of the invention, the device comprises a calibration unit for determining the four determined positions, said calibration unit being arranged to register at least two set points, a first set point being calibrated to the lower retrieval position, and a second set point being calibrated to one of the two upper positions, and to calculate the remaining positions of the four determined positions.

This has the advantage that only two positions of the four determined positions needs to be calibrated to for the device to be able to move to four separate positions. This provides a very fast and efficient device which has a reduced amount of user input needed for the device to perform its operations correctly. The device is thereby user friendly and easy to understand and use.

According to yet another aspect of the invention, when a down command is received by means of the user interface and the holding tool holds an object, the load sensing means is during the movement arranged to detect if the holding tool is no longer supporting the same amount of load, wherein upon such a detection the control unit is arranged to automatically stop the driving means.

This has the advantage that when the device is placing an object down onto one of the placing positions, the device will automatically stop at the correct position. A user of the device will thereby know that the object is being placed correctly without special care to positioning of the holding tool. This is beneficial as it provides a very efficient and reliable device which is easy to use for a user.

According to a further aspect of the invention, the load sensing means is arranged to utilize variations of driving variables within the driving means to detect whether the holding tool holds an object or not.

This has the advantage that the load sensing means are incorporated into the driving means which saves space in the device. The load sensing means further utilizes already existing variables within the device, which is beneficial as the load sensing means may then perform its functions simultaneously with controlling the movement of the holding tool without additional input from a user.

According to an even further aspect of the invention, the driving means comprises hydraulics, wherein the variations of driving variables within the driving means are pressure variations within at least one hydraulic cylinder.

This has the advantage that the load sensing means can determine if the holding tool holds an object in a very direct and accurate manner. As the pressure within the hydraulics are directly dependent on the work done by the driving means and the holding tool, the load sensing means will give a direct feedback if the pressure drops, which occurs when the object held by the holding tool reaches ground or another form of lower surface, wherein the object will then be partly supported by said ground or surface. Thereby a very trustworthy and efficient load sensing means is provided to the device.

According to another aspect of the invention the holding tool is pivotable to a second orientation, so as to also be able to grip the object from said second orientation.

This has the advantage that an object, which object has a shape which may be more suitable to grip from another direction, also may be picked up with the device. This is beneficial for example for round objects such as bales of harvested crops; as such bales are more suitable to grip around the circumference of the round shape of said bale.

According to yet another aspect of the invention the device is semi-automatically movable between four additional positions, said four additional positions all being in a range between the lowest point and the highest point. The four additional positions are defined based on the holding tool being in the second orientation, wherein in the second mode of operation, the control unit is arranged to control the driving means for moving the tool in accordance with an additional predetermined scheme. Said additional predetermined scheme comprises; —moving the holding tool to an additional upper retrieval position, when an up command is received by means of the user interface and the holding tool is not holding an object, —moving the holding tool to an additional upper placing position, when an up command is received by means of the user interface and the holding tool holds an object, —moving the holding tool to an additional lower retrieval positon, when a down command is received by means of the user interface and the holding tool is not holding an object, and—moving the holding tool to an additional lower placing positon, when a down command is received by means of the user interface and the holding tool holds an object.

This has the advantage that a device is provided which may be used for fast and efficient semi-automatic movement of object between two positions in an additional orientation of the holding tool. Such a device may be used for picking up a plurality of objects from one location, wherein the objects are located at the additional lower retrieval position respectively and oriented in such a way that it is preferable to approach said object from another angle of orientation, and moving them to and placing them on, another location, wherein the objects can be placed at said another location at the upper retrieval position. Such operations may be performed at a wide variety of working environments and situations, such as shelving products in a store, organizing and/or relocating products in a warehouse, or packing objects into a truck for transportation. The present invention is specifically intended to be used for agricultural applications, such as moving bales of harvested crop from a field to some sort of storage facility; however it may be used for a wide variety of purposes as exemplified above. Bales of harvested crop is ideal to pick up with the invention due to said bales may be placed on a field in two distinct orientations, as in lying down or standing up, when viewed as a cylinder. With the device according to the invention being able to be pivoted so as to have the holding tool in the second orientation, the device may pick up said bales of harvested crop from both directions. As the device in the second mode of operation, with the holding tool being in the second orientation, automatically moves the driving means to the additional placing positions if the holding tool is holding an object, and to the additional retrieval positions if not, only one command is needed to move to the correct position in either the up or down directions, with the objects and holding tool being in the second orientation. This is beneficial as a user of the device only needs to give a single input to the user interface, being an up or down command, to move to the correct position in height automatically. When used, the device will thereby automatically align with picking up or placing an object without the user of the device giving any input if the device holds and object or not. This feature hence works for objects of multiple orientations.

According to a further aspect of the invention the calibration unit can determine the four additional determined positions, said calibration unit being arranged to register at least two additional set points, a first additional set point being calibrated to the additional lower retrieval position, and a second additional set point being calibrated to one of the two additional upper positions, and to calculate the remaining positions of the four additional determined positions.

This has the advantage that the calibration unit may be used in a similar manner as for the two initial set points, wherein the calibration unit may only need to be calibrated to two additional set points to be able to provide the device with needed information to work for all four additional positions. This provides a fast and efficient device which has a reduced amount of user input needed for the device to perform its operations correctly. The device is thereby user friendly and easy to understand and use.

According to an even further aspect of the invention the holding tool is arranged to alter between the two orientations by inputting an orientation change command by means of the user interface.

This has the advantage that the device easily may be used for the positions of both the predetermined scheme and the additional predetermined scheme interchangeably. This is beneficial as the device may be used for a plurality of objects which may have alternating orientations amongst them. The device may therefore calibrated with regards to both said predetermined schemes and then be used for both interchangeably during a working operation by means of a single input to the user interface if the next object in line is in another orientation relative the previous object.

According to another aspect of the invention the control unit is arranged to control the driving means for moving the tool in accordance with a third predetermined scheme, wherein the third predetermined scheme comprises a combination of the predetermined scheme and the additional predetermined scheme and their determined positions respectively.

This has the advantage that the device may be used to pick up objects at one location wherein the orientation of said objects may vary at their respective retrieval positions but where a common orientation is desired when being positioned at a common position, wherein a first plurality of the objects being in a first orientation and a second plurality of object being in a second orientation. The third predetermined scheme thereby allows for a wide variety of operations, wherein the orientations of the object being handled may be shifted as desired during the retrieval and placing operations.

According to yet another aspect of the invention the driving means will automatically perform a height adjusting movement of the holding tool when the orientation of the tool is changed, the height adjusting movement corresponding to a height difference defined as the difference in height of the tool when in the lower retrieval positon and the additional lower retrieval positon.

This has the advantage that the holding tool will automatically be configured for the correct height of the next intended operation, if said height is affected when the orientation is changed. This further has the advantage that, if objects of different orientations require the holding tool to be adjusted in height, said objects may be picked up or placed without a user of the device having to adjust said height difference for each change in orientation of the holding tool. If an object next in line to retrieve or place is in another orientation, which would require both an orientation change and a combined height adjustment dependent on said orientation change, a user of the device would only need to change to the correct orientation and said height difference would be accounted for automatically.

According to a further aspect of the invention the driving means is arranged to determine the mass of an object when said object is lifted a distance by means of the driving means.

This has the advantage that the objects being retrieved and placed by the device may at the same time be monitored with regards to their individual masses. Thereby said masses may further be documented in a variety of ways, such as for said individual mass, highest mass, lowest mass, average mass, median mass or total mass of all objects, or a combination of described data. Furthermore the number of objects lifted may easily also be counted and monitored. This is beneficial as the device, without requiring additional input, may provide useful information regarding the objects being moved at the same time.

According to an even further aspect of the invention an agricultural vehicle comprising a device for semi-automatic movement of a holding tool is provided.

This has the advantage that a vehicle with a device according to the invention is provided, wherein the device is able to perform the described retrieval and placing operations as disclosed within the application, while at the same time being able to be driven around by means of the function of the vehicle. This has the advantage that the positions relating to the predetermined schemes may be at different locations far apart in a horizontal view, wherein the lifting portion of the retrieval and placing operations are handled by the device, wherein the vehicle is driven between said different locations.

According to yet another aspect of the invention a method, for an agricultural device, for semi-automatic movement, of a holding tool for holding an object, between two positions is provided. The holding tool being operatively connected to driving means for moving the holding tool up and down between a lowest point and a highest point, and wherein the holding tool is semi-automatically movable between four determined positions; an upper retrieval position, an upper placing position, a lower retrieval positon, and a lower placing position, said four positions all being in a range between the lowest point and the highest point. The method comprising the steps of: a) receiving, via a user interface, an input command comprising an up command or a down command, b) determining if the holding tool holds an object, and c) automatically controlling the driving means by means of the control unit, wherein; the driving means moves the holding tool to the upper retrieval position, when an up command is received by means of the user interface and the holding tool is not holding an object, —the driving means moves the holding tool to the upper placing position, when an up command is received by means of the user interface and the holding tool holds an object, —the driving means moves the holding tool to the lower retrieval positon, when a down command is received by means of the user interface and the holding tool is not holding an object, and—the driving means moves the holding tool to the lower placing positon, when a down command is received by means of the user interface and the holding tool holds an object.

This has the advantage that a method is provided which may be used for fast and efficient semi-automatic movement of an object between two positions. Such a method, using a device for such movement operations, may be used for picking up a plurality of objects from one location, wherein the objects are located at the lower retrieval position respectively, and moving them to and placing them on, another location, wherein the objects can be placed at said another location at the upper retrieval position. Such operations may be performed at a wide variety of working environments and situations, such as shelving products in a store, organizing and/or relocating products in a warehouse, or packing objects into a truck for transportation. The method of the present invention is specifically intended to be used for agricultural applications, such as moving bales of harvested crop from a field to some sort of storage facility; however it may be used for a wide variety of purposes as exemplified above. As the method automatically moves the driving means to the placing positions if the holding tool is holding an object, and to the retrieval positions if not, only one command is needed to move to the correct position in either the up or down directions. This is beneficial as a user of the method only needs to give a single input to the user interface, being an up or down command, to move to the correct position in height automatically. When using the method according to the present invention, the device will thereby automatically align with picking up or placing an object without the user of the device giving any input if the device holds and object or not.

According to a further aspect of the invention the method further comprises a step d) which is carried out simultaneously as step c), wherein when step c) is automatically controlling the driving means for moving the holding tool, and when a down command is received by means of the user interface and the holding tool holds an object, step d) comprises sensing of, during the movement of the holding tool, if the holding tool is no longer supporting the same amount of load, wherein upon such a detection the control unit is arranged to automatically stop the driving means.

This has the advantage that the method may be used to place objects at any position while at the same time the holding device will automatically stop at the correct height, that is, when the holding tool is no longer supporting the weight of the object being placed. Thereby a method is provided which will place objects correctly and reduce the amount of input needed from a user to the user interface. Hence a fast and efficient method for movement for placing objects is provided.

According to yet a further aspect of the invention the method comprises a step e), which is carried out before step a), of determining the four determined positions, said step e) comprising; registering at least two set points, a first set point being calibrated to the lower retrieval position, and a second set point being calibrated to one of the two upper positions, and calculating the remaining position(s) of the four positions based on the recorded set points.

This has the advantage that a method is provided, which method may be used to correctly align a holding tool with four different locations, but only needs to be calibrated with regards to two of said positions. The method is therefore advantageous to use for retrieval and placing of objects depending on all said four positions, wherein the amount of input required from a user to calibrate the method and the device is lowered. Hence, a fast and efficient method is provided.

According to another aspect of the invention, software for obtaining information related to driving means is provided, said software being adapted to perform the method according to the invention.

This has the advantage that the method easily may be performed by means of a computer, which enables a precise and accurate method when performed.

BRIEF DESCRIPTION OF THE DRAWINGS

Below is a description of, as examples, embodiments of the invention with reference to the enclosed drawings, in which.

DETAILED DESCRIPTION OF THE INVENTION

Figure 1:
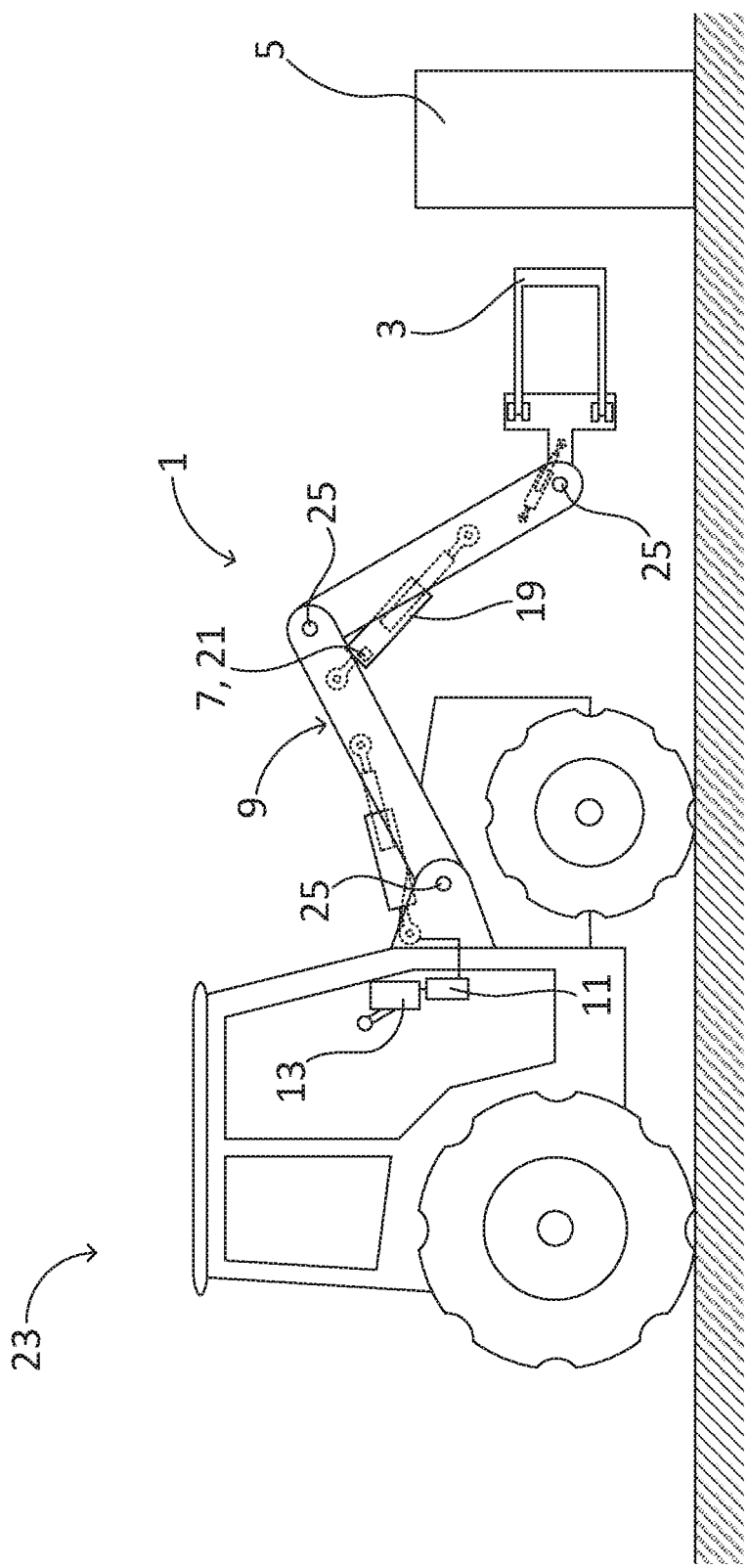
FIG. 1 shows a schematic illustration of a vehicle comprising a device according to the invention.
Figure 2A:
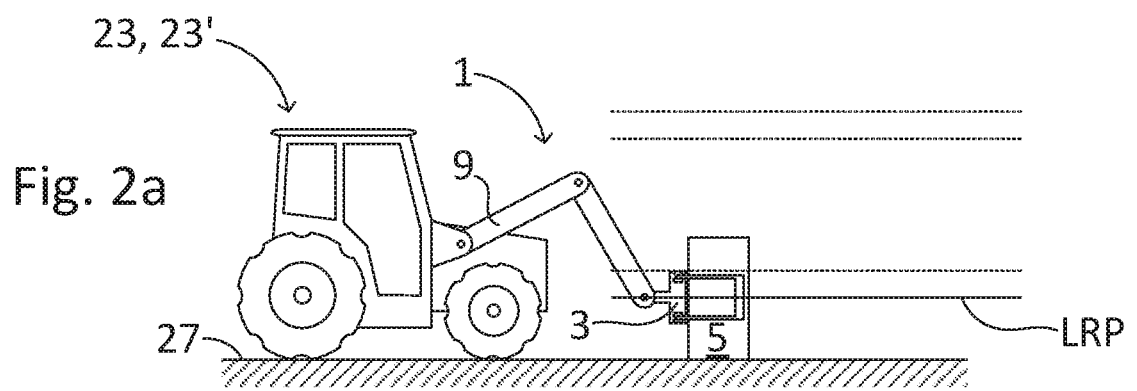
FIGS. 2*a-d* show schematic illustrations of a tractor comprising a device according to the invention, with the holding tool in different positions.
Figure 2B:
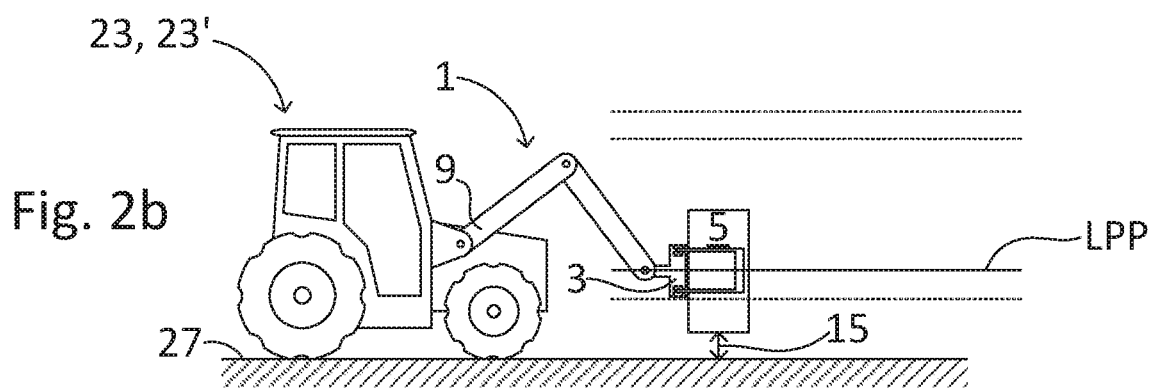
Figure 2C:
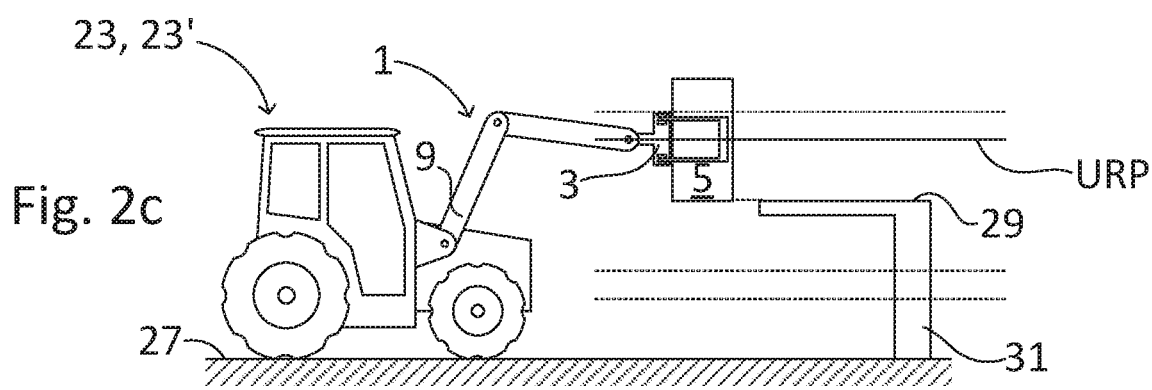
Figure 2D:
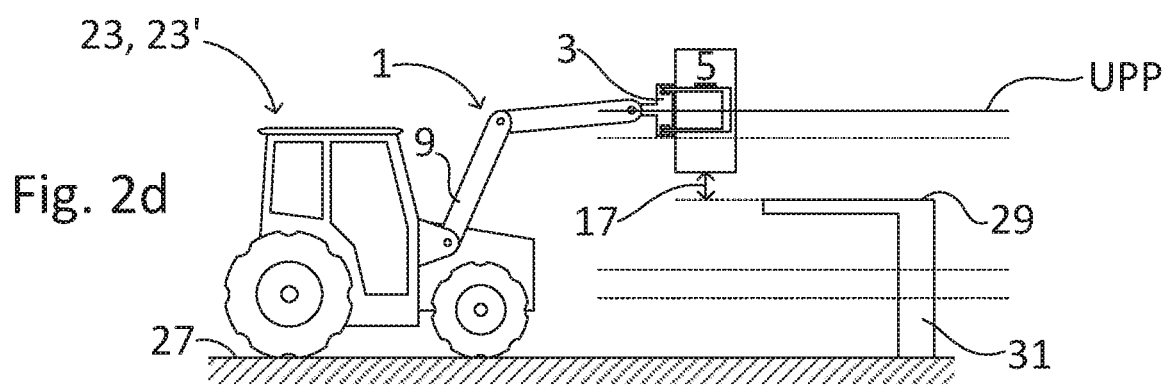
Figure 3A:
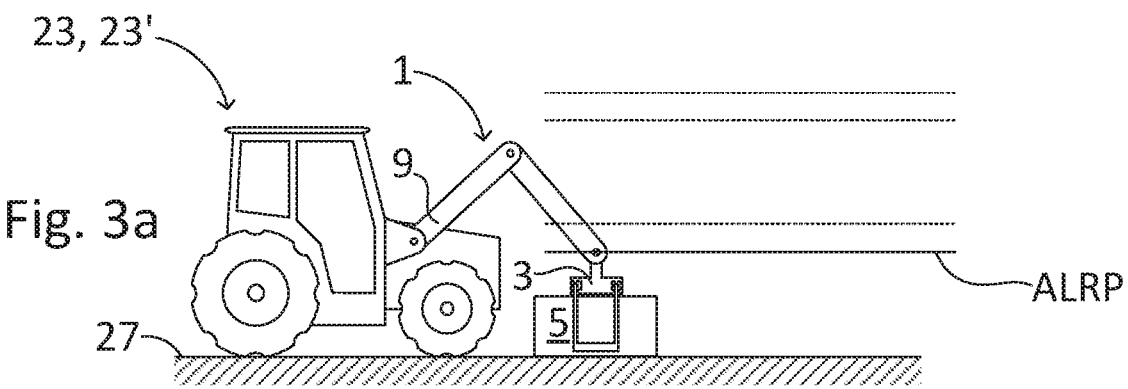
FIGS. 3*a-d* show schematic illustrations of a tractor comprising a device according to the invention, with the holding tool being in a second orientation and in different positions.
Figure 3B:
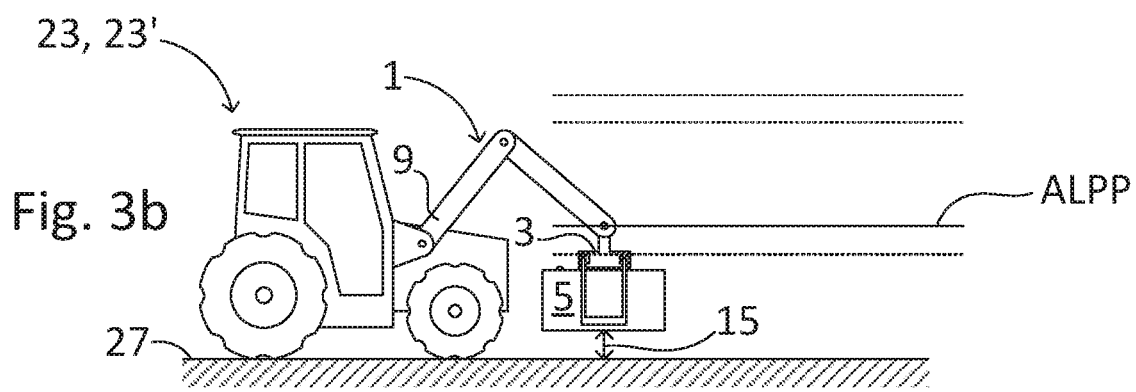
Figure 3C:
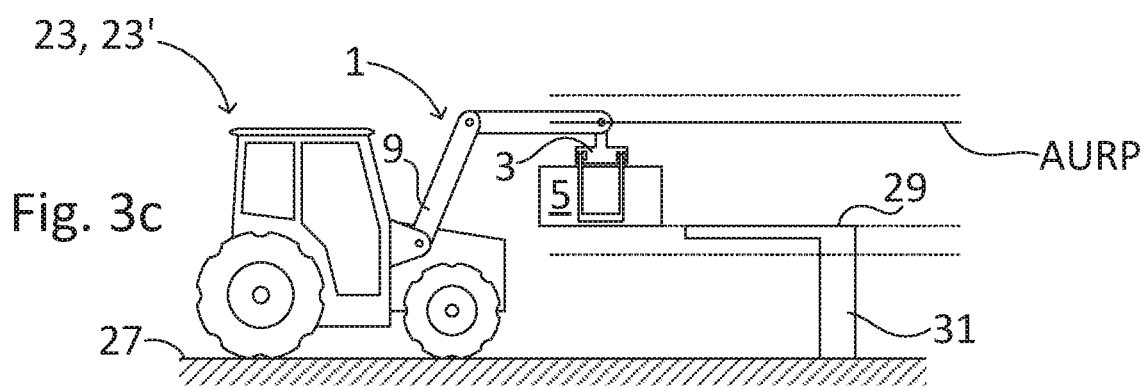
Figure 3D:
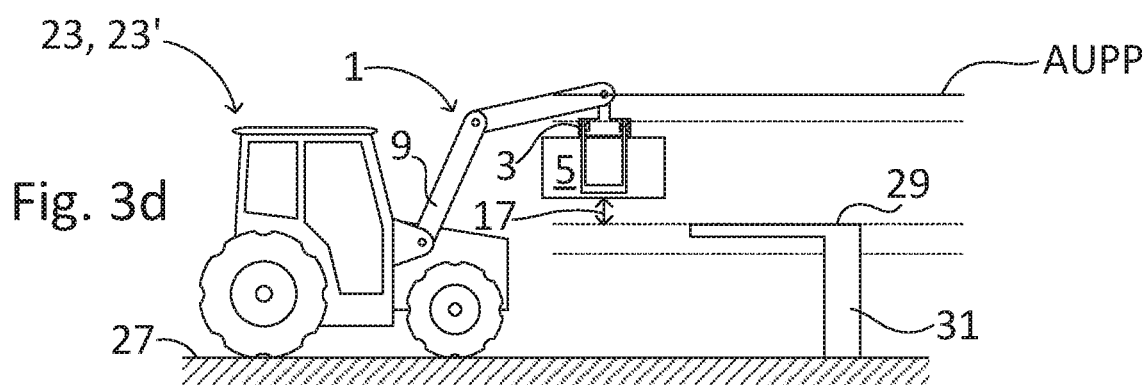

Hereinafter different embodiments and examples of the invention will be described in detail. Reference numbers are not to be viewed as restrictive in relation to the scope of the protection given by the patent claims, only as assistance in understanding the various technical features of the invention.

As will be realized the invention can be modified in various ways without deviating from the scope of the claims, and aspects of the different embodiments may be combined to achieve a variety of combined technical features and embodiments. Hence, the description should be viewed as illustrative and not restrictive.

According to a first aspect of the invention an agricultural device 1 for semi-automatic movement of a holding tool 3, for holding an object 5, between two positions, is provided. The two positions are at different heights in relation to each other. The device comprises; said holding tool 3 for holding the object 5, load sensing means 7 for determining if the holding tool 3 holds an object 5, driving means 9 for moving the holding tool up and down between a lowest point and a highest point, a control unit 11 for controlling the driving means 9, and a user interface 13 for user input to the control unit 11. The device 1 can be used in two modes of operations, wherein the holding tool in a first mode of operation is freely movably between the lowest point and the highest point by means of user input via the user interface 13, and in a second mode of operation is semi-automatically movable between a plurality of determined positions within a range between the lowest and highest point. The holding tool 3 may be any kind of holding tool 3 suitable for holding an object 5 which is desired to be moved. Such holding tools 3 may be a lifting element such as used for a forklift, or a gripping tool which grips the object from at least two sides of the object 5. The device 1 may further comprise additional driving means for lateral movement, which is needed if the two positions are separated by a lateral distance from each other as well as being at a height difference. The load sensing means 7 comprises a suitable sensor for sensing if the holding tool is holding an object 5 or not. Further details regarding the load sensing means 7 will be described later in the description.

The device 1 may be, as stated previously, used in two modes of operation, wherein the first mode of operation is a free moving mode, wherein the holding tool 3 may be moved up and down freely by means of input to the user interface 13. The second mode of operation is a mode for the semi-automatic movement of said object 5, wherein the object 5 is to be moved from one position to another. The device 1 is preferably suited for moving a large number of objects 5 from one position to another, such as from a field or a floor of a storage facility to a storage shelf or a loading area of a truck or similar. The semi-automatic movement is thereby utilized to make such an operation faster and easier to manage. In the second mode of operation the control unit is arranged to control the driving means 9 for moving the holding tool 3 in accordance with a predetermined scheme comprising four determined positions. Said predetermined scheme comprises; —moving the holding tool 3 to an upper retrieval position URP, when an up command is received by means of the user interface 13 and the holding tool 3 is not holding an object 5, —moving the holding tool 3 to an upper placing position UPP, when an up command is received by means of the user interface and the holding tool 3 holds an object 5, —moving the holding tool 3 to a lower retrieval positon LRP, when a down command is received by means of the user interface 13 and the holding tool 3 is not holding an object 5, and—moving the holding tool 3 to a lower placing positon LPP, when a down command is received by means of the user interface 13 and the holding tool 3 holds an object 5. This predetermined scheme thereby uses four positions URP, UPP, LRP, LPP of importance for retrieving or placing an object 5 from or at two positions. The upper retrieval position URP is defined as the position in height for the holding tool 3 where an object is lying or standing when in rest in said position URP, such as on a storage shelf or the loading area of a truck or similar. The position is thereby of the correct height for a holding tool to be aligned with if the object 5 thereon is to be retrieved. The upper placing position UPP is defined as laterally at the same position as the upper retrieval position URP, but being above the upper retrieval position URP at a first distance 15, which first distance 15 is a predetermined distance deemed suitable for not dragging the holding tool 3 and/or the object 5 in contact with the surface whereon the object is to be placed. Hence, the upper placing position UPP is the position directly above where the object 5 is to be placed, wherein only a small downwards movement is required to perform a placing operation of the object 5 at the upper retrieval position URP. Similarly, the lower retrieval position LRP is defined as the position in height for the holding tool 3 where an object 5 is lying or standing when in rest in said position LRP, such as on the ground, or a floor or similar. The position LRP is thereby of the correct height for a holding tool 3 to be aligned with if the object 5 thereon is to be retrieved. The lower placing position LPP is defined as laterally at the same position as the lower retrieval position LRP, but being above the lower retrieval position LRP at a second distance 17, which second distance 17 is a predetermined distance deemed suitable for not dragging the holding tool 3 and/or the object 5 in contact with the surface whereon the object 5 is to be placed. Hence, the lower placing position LPP is the position directly above where the object 5 is to be placed, wherein only a small downwards movement is required to perform a placing operation of the object 5 at the lower retrieval position LRP. The first and second distances 15, 17 may be equal, or they may be separate depending on the needs for the working operation at hand. If for example objects 5 are to be moved from uneven ground outside, such as from an agriculture field, and are to be moved to a flat area, such as the loading area of a truck, the second distance 17 may be set to be larger than the first distance 15, to provide more clearance underneath the object 5 and/or holding tool 3 when moved above the more uneven outside ground. However, said first and second distances 15, 17 may of course be set to be equal, wherein a common distance is used, which distance provides enough clearance for the device 1 to operate efficiently and in a safe manner in the vicinity of both retrieval positions URP, LRP. As the load sensing means 7 senses if the holding tool 3 is holding an object 5 or not, the device 1 may automatically know which of the two upper positions URP, UPP a user wants to move the holding tool 3 to when an up command is given to the user interface 13. If the holding tool 3 is holding an object 5 and a user of the device 1 gives an up command to the user interface 13, it should be most plausible that said object 5 is to be placed at the upper retrieval position URP, wherein the driving means 9 moves the holding tool 3 to the correct height for such an operation. Hence, the driving means 9 moves the holding tool 3 to the upper placing position UPP, wherein an additional down command places the object 5 at the upper retrieval position URP. On the contrary, if the holding tool 3 is not holding an object 5, as is monitored by means of the load sensing means 7, the holding tool 3 is directly moved to the upper retrieval position URP, wherein the holding tool 3 may engage an object 5 which is to be retrieved from said position URP. The same concept is used in a corresponding manner for the two lower positions LRP, LPP. This predetermined scheme thereby provides a device 1 which is ideal to use for a repeated process of retrieving objects 5 from one position and placing said objects 5 at another position, wherein said positions differ in height. If an operator of the device 1 changes his/her mind and/or makes a mistake, the device 1 is easily set to the first mode of operation, wherein the holding tool 3 is freely movable, wherein the operator may make the suitable adjustments and/or corrections to the positioning of the holding tool 3. When the upper URP, UPP and the lower positions LRP, LPP respectively are placed at a lateral distance from each other, which requires a movement of the device 1 between said positions between the up and down movement, the lower placing position LPP may be preferred to also use as a transfer position for the holding tool 3. Hence, if an object 5 is retrieved from the lower retrieval position LRP and is to be moved to the upper placing position UPP, it might not be desired to move the object 5 all the way up to the upper placing position UPP directly. For such cases the device 1 may still use the movements of the predetermined scheme to place the holding tool 3 when holding an object 5 in the lower placing position LPP while moving the device 1. When giving an up command the holding tool 3 will start to move the holding tool 3 with the object 5 up towards the upper placing position UPP, as dictated by the predetermined scheme. However, after the holding tool 3 has passed the lower placing position LPP, the operator of the device may opt to give a down command to lower the holding tool 3 to the lower placing position LPP and use this position as a safe transfer position. The upper placing position UPP might be deemed as an unsafe transfer position if the two upper positions URP, UPP are at a large height, the object 5 being moved is heavy, the lateral distance between the upper URP, UPP and lower positions LRP, LPP is large, or any combination of these factors. For such cases using the lower placing position LPP as a transfer position might be desired to achieve a safe equipment and usage thereof. The device 1 may further also be modified to include a specific transfer position, wherein the holding tool 3 is moved to said specific transfer position by means of a transfer position input in the user interface 13. This specific transfer position may be calibrated in the first mode of operation, and may be calibrated to any suitable height, deemed suitable by the operator of the device 1. The specific transfer position may hence by the same as the lower placing position LPP, or separate from the lower placing position LPP.

The predetermined scheme may further comprise additional movements for specific situations. The predetermined scheme may comprise: —moving the holding tool 3 to the lower retrieval positon LRP, when a down command is received by means of the user interface 13, the holding tool 3 is holding an object 5, and is positioned at the lower placing position LPP. This may be beneficial as it may expand the predetermined scheme to further comprise a movement which may be used for a placing operation specifically. The load sensing means 7 may further also be used individually as function for automatic stopping of the holding tool 3 of the device 1. As the load sensing means 7 are arranged to sense if the holding tool 3 is holding an object 5 or not, said sensing may be utilized by the control unit 11 during movement operation of the driving means 9 and holding tool 3 when the holding tool 3 is not holding an object 5. The load sensing means 7 preferably comprises a sensor, and/or sensor mechanism which will sense if the holding tool 3 is holding an object 5 based on the movement of the driving means 9 and holding tool 3. Thus, such a sensor and/or sensor mechanism may thereby also utilize detection the same type of sensor signals for determining if the holding tool 3 and/or driving means 9 would engage an unexpected object or surface surrounding the working movement of the device 1. When such an occurrence is detected, the control unit 11 will automatically stop the driving means 9 in their movement. This feature may be used as a means for automatic detection of objects and/or surfaces. Said feature may also be used as a failsafe mechanic feature which guarantees that the holding tool 3 will not keep moving downwards or upwards if the holding tool 3, and/or an object 5 held by the holding tool 3 reaches an above or underlying surface. The device 1 may thereby provide a means for minimizing the risk of damaging objects 5, equipment and/or surfaces such as for example shelves. This feature may be implemented to use in both the first and second modes of operations of the device 1. This feature may also be opted to be turned on and off depending on if the operator of the device 1 deems it necessary and/or desirable to have such a feature active. The load sensing means 7 may thus also function as an automatic stop function for the holding tool 3 and the driving means 9, which is a beneficial feature of the device 1 both from an operating and a safety perspective for the device 1.

The device 1 may further comprise a calibration unit for determining the four determined positions URP, UPP, LRP, LPP, said calibration unit being arranged to register at least two set points, a first set point being calibrated to the lower retrieval position LRP, and a second set point being calibrated to one of the two upper positions URP, UPP, and to calculate the remaining position(s) of the four determined positions URP, UPP, LRP, LPP. The calibration unit is thereby used at the beginning of a working operation for the device 1. The device 1 is preferably used in the first mode of operation to start with, wherein an operator moves the holding tool 3 to the lower retrieval position LRP, and gives a calibrate set point command to the user interface 13. The height of the lower placing position LPP may thereafter be calculated and stored in the control unit 11 of the device 1. The operator may thereafter move the holding tool 3 to one of the upper positions URP, UPP. The operator may move the holding tool 3 to the upper retrieval position URP and calibrate the second set point to the upper retrieval position URP in the same manner as the first set point at the lower retrieval position LRP. The upper placing position UPP is thereafter calculated and stored in the control unit 13 in the same manner. The operator may also move the holding tool 3 to the upper placing position UPP and calibrate the second set point to said upper placing position UPP instead. If the upper placing position UPP is used as the second set point, the upper retrieval position URP may afterwards be automatically located and sensed by means of the load sensing means 7. Regardless, the operator only needs to calibrate two set points, wherein after said calibration is performed, the device 1 may perform the semi-automatic movement between all four positions URP, UPP, LRP, LPP, which provides an accurate and efficient device 1 which requires minimal control inputs from the operator.

The device 1 may further operate in such a way that, when a down command is received by means of the user interface 13 and the holding tool 3 holds an object 5, the load sensing means 7 is during the movement arranged to detect if the holding tool 3 is no longer supporting the same amount of load, wherein upon such a detection the control unit 11 is arranged to automatically stop the driving means 9. Regardless of the type of holding tool 3 used, the object 5 will, when getting into contact with a surface beneath it, partly be supported by said surface. This in turn leads to that the forces acting on the holding tool 3 due to holding said object 5 will decrease as a result of the object 5 also being supported by means of the underneath surface. Thereby the load sensing means 7 will detect that such an occurrence has taken place and will give input to the control means 11 to stop the driving means 9. This feature provides a fast, easy and reliable way to detect the respective retrieval positions URP, LRP for the holding tool 3. If said function is used when an object 5 is held at a distance above a desired retrieval position URP, LRP, the operator merely needs to lower the holding tool 3 to make the object 5 approach the correct position URP, LRP, whereby the correct height will be detected automatically. This may be used in the first mode of operation for the device 1 as a means to properly approach the both retrieval positions URP, LRP, or be used in the second mode of operation as a means to initially find and establish the respective retrieval positions URP, LRP. The feature will also provide as a failsafe mechanic if the device 1 for whatever reason would become de-calibrated during use, wherein said feature guarantees that the holding tool 3 will not keep moving downwards if the holding tool 3, and/or an object 5 held by the holding tool 3 reach an underlying surface. The device 1 may thereby provide a means for minimizing the risk of damaging objects 5, equipment and/or surfaces such as for example shelves.

As the control unit 11 will automatically stop the driving means 9 when detection of interaction with an underlying surface occurs, a down command is always safe to perform by an operator of the device 1. If the holding tool 3 is in the upper placing position UPP and is holding an object 5 and a down command is received, the holding tool will attempt to move according to the predetermined scheme and move the holding tool 3 towards the lower placing position LPP. If however a shelf or similar is positioned under the object 5, along the intended movement path, the object will come in contact with said shelf when the holding tool is in the upper retrieval position URP wherein the driving means 9 will automatically stop. This may be utilized as a means to find the correct value of a not yet defined upper retrieval position URP. It may also be used as a means to re-calibrate such a position, and/or as a fail-safe mechanism for unintended interactions with external objects and/or surfaces.

As stated previously, the predetermined scheme may further comprise: —moving the holding tool 3 to the lower retrieval positon LRP, when a down command is received by means of the user interface 13, the holding tool 3 is holding an object 5, and is positioned at the lower placing position LPP. Thus, such a movement may easily be performed if the lower retrieval position LRP is already specified. However, if the lower retrieval position is not yet specified, such a downwards movement may still be allowed when a down command is received from the user interface 13, under the above specified conditions, as the load sensing means 7 will automatically stop the driving means 9 when the lower retrieval position LRP is reached.

The load sensing means 7 may be arranged to utilize variations of driving variables within the driving means 9 to detect whether the holding tool 3 holds an object 5 or not. The load sensing means 7 is thereby in an effective manner incorporated within the device 1.

The driving means 9 may comprise hydraulics, wherein the variations of driving variables within the driving means 9 are pressure variations within at least one hydraulic cylinder 19. The load sensing means 7 may thus comprise a pressure sensor 21 arranged to read said pressure variations. As the pressure within a hydraulic cylinder 19 is directly coupled to the work it performs and thus the mass being moved by means of the driving means 9, the pressure variations will directly indicate if an object 5 has reached a retrieval position URP, LRP where the object 5 is no longer held up only with the holding tool 3. By means of monitoring the pressure within the at least one hydraulic cylinder 19, the load sensing means 7 may also further be used to detect if the holding tool 3 reaches a surface even if it is not holding an object 5. As the pressure within the hydraulic cylinder 19 will also be affected if an empty holding tool 3 reaches a surface, which will provide resistance to the movement of the holding tool 3 and thus variations in the pressure within the hydraulics, the control unit 11 may stop the driving means 9 in this situation as well. The device 1 thereby provides a failsafe mechanism which in turn leads to a very safe device 1 to use for an operator, wherein both personal safety and material safety is increased. As should be understood this feature may be opted to turn on and off if desirable, if an operator of the device 1 may have use for the holding tool 3 not stopping automatically.

The holding tool 3 may furthermore be pivotable to a second orientation, so as to also be able to grip the object 5 from said second orientation. This might be used for a variety of operations relating to moving objects 5, specifically if the geometry and/or placement of the objects 5 are alternating. An object 5 with a specific geometric shape may require to be engaged from one specific side, but if said objects 5 are randomly placed at a spot with regards to their orientation, said specific side may be pointing in several directions. Such an example is bales of harvested crop in agriculture environments. Such bales are generally cylinder shaped, wherein a holding tool 5, more specifically a gripping tool, is arranged to grip the bale with a claw like tool around the circumference of the bale. However, it may not be guaranteed that the bale is positioned in a specific manner. The bales may be standing up, wherein the holding tool 3 in the form of a gripping tool is to engage the bale from the side, wherein the height of the lower retrieval position LRP in this case is the holding tool 3 aligned with the centre of mass of the bale, and oriented to approach the bale from the side. However, as the bales may be lying down, either all of them or a number of them, the holding tool 3 then needs to pivoted 90° downwards to be able to engage the bale from above instead. The placement of such bales may also be optional in regards to if it is desired to place them standing up or lying down. The holding tool 3 according to the present invention being pivotable as described therefore provides the means to retrieve and place for example bales, regardless of their individual positioning at the retrieval URP, LRP and placing positions UPP, LPP. The pivoting of the holding tool 3 is achieved by means of the driving means 9, which comprise pivoting means which may pivot the holding tool 3 with or without moving the holding tool 3 up or down.

The device 1 may further be semi-automatically movable between four additional positions; said four additional positions all being in a range between the lowest point and the highest point. The four additional positions are defined based on the holding tool 3 being in the second orientation, wherein in the second mode of operation, the control unit 11 is arranged to control the driving means 9 for moving the tool in accordance with an additional predetermined scheme. Said additional predetermined scheme comprises; —moving the holding tool 3 to an additional upper retrieval position AURP, when an up command is received by means of the user interface 13 and the holding tool 3 is not holding an object 5, —moving the holding tool 3 to an additional upper placing position AUPP, when an up command is received by means of the user interface 13 and the holding tool 3 holds an object 5, —moving the holding tool 3 to an additional lower retrieval positon ALRP, when a down command is received by means of the user interface 13 and the holding tool 3 is not holding an object 5, and—moving the holding tool 3 to an additional lower placing positon ALPP, when a down command is received by means of the user interface 13 and the holding tool 3 holds an object 5. The additional predetermined scheme is used in a similar manner as the first predetermined scheme, the only substantial difference being that the holding tool 3 is in the second orientation, and that the four additional positions AURP, AUPP, ALRP, ALPP may differ from the first set of positions URP, UPP, LRP, LPP used within the first predetermined scheme.

The calibration unit may furthermore also determine the four additional determined positions AURP, AUPP, ALRP, ALPP, said calibration unit being arranged to register at least two additional set points, a first additional set point being calibrated to the additional lower retrieval position ALRP, and a second additional set point being calibrated to one of the two additional upper positions AURP, AUPP, and to calculate the remaining positions of the four additional determined positions AURP, AUPP, ALRP, ALPP. The variations of the details of this feature may be viewed as similar to the initial determined positions URP, UPP, LRP, LPP, wherein their functionality and function works in the same manner, only with an additional set of four additional positions AURP, AUPP, ALRP, ALPP. As should be understood, the options regarding choosing the additional second set point are therefore the same as for the set points within the first predetermined scheme.

The holding tool 3 may further be arranged to alter between the two orientations by inputting an orientation change command by means of the user interface 13. Hence, the device 1 may be used for two separate sets of positions URP, UPP, LRP, LPP, AURP, AUPP, ALRP, ALPP, wherein the device 1 in a fast and easy manner may be used for both sets of positions URP, UPP, LRP, LPP, AURP, AUPP, ALRP, ALPP interchangeably. It is therefore not necessary to re-calibrate the device 1 every time an orientation change is needed, instead two sets of calibration operations may be performed at the start of a movement operation, wherein the holding tool 3 thereafter may be swapped between the two predetermined schemes to use the respective set of positions URP, UPP, LRP, LPP, AURP, AUPP, ALRP, ALPP and calibrations. Furthermore, being able to swap between the two orientations in such a way, the device 1 may also handle objects 5 with different orientations but where it is desired to place said objects 5 in the same orientation at the location whereon it is to be placed. The device 1 may thereby be used with ease at a high speed of operation without the need to put a lot of attention and focus on aiming the holding tool 3 for each specific object 5 being moved.

The control unit 11 may further be arranged to control the driving means 9 for moving the holding tool 3 in accordance with a third predetermined scheme, wherein the third predetermined scheme comprises a combination of the predetermined scheme and the additional predetermined scheme and their determined positions respectively URP, UPP, LRP, LPP, AURP, AUPP, ALRP, ALPP. The third predetermined scheme may thus be used for semi-automatic movement of objects 5 wherein the orientation of the holding tool 3 needs to be shifted during operation. Such a case might be as previously described with objects having different orientation at a retrieval location, wherein the holding tool 3 is alternated between the lower retrieval position LRP and the additional lower retrieval position ALRP for the different orientations of the objects 5. As should be understood, the third predetermined scheme may comprise any combination of positions URP, UPP, LRP, LPP, AURP, AUPP, ALRP, ALPP from the predetermined scheme and the additional predetermined scheme. By calibrating the device 1 by means of the calibration unit, an operator of the device 1 may pick and choose the suitable positions to be included in the third predetermined scheme for the moving operation at hand. The device may of course comprise even further predetermined schemes, for being able to handle a plurality of moving operations. Such further additional predetermined schemes may simply by calibrated and saved in the user interface 13 of the device 1.

The driving means 9 may further automatically perform a height adjusting movement of the holding tool 3 when the orientation of the holding tool 3 is changed, the height adjusting movement corresponding to a height difference defined as the difference in height of the holding tool 3 when in the lower retrieval positon LRP and the additional lower retrieval positon ALRP. Such a function is operated by means of the control unit 11, and is performed when such a height difference is detected. This means that if the holding tool 3 is positioned in the first orientation and being at a specific position, and is to be shifted to the second orientation; the holding tool 3 will automatically end up in the corresponding respective position in the second orientation. In other words, if the holding tool 3 for example is located in the lower placing position LPP, and is pivoted to the second orientation, the holding tool 3 will after said pivoting be positioned in the additional lower placing position ALPP automatically. This is very beneficial for moving operations where the orientations of the objects 5 may vary as the holding tool 3 may be shifted between the two orientations without a further need for height adjustments after a pivoting operation of the holding tool 3. This feature further ensures that the holding tool 3 does not hit any object or surface in the vicinity, which could be a potential risk if the holding tool 3 was pivoting freely without an accompanied height adjustment. Furthermore, if the geometry of an object 5 to be moved with the device 1 is known, the control unit 11 may be programmed to account for said geometry when the holding tool 3 is pivoted when the holding tool 3 is holding said object 5. As the object 5 will rotate when held by the holding tool 3 when the holding tool 3 is pivoted, the shape of the cross section of the object 5, seen from an imaginary axis of rotation of the object 5, will affect the distance to for example the ground or floor beneath the object 5. If the object 5 has a substantially square shaped cross section, a corner of said square would rotate about the axis of rotation when the object is rotated 90°. For such a rotational movement, the longer distance to said corner compared to the distance to one of the sides of the object 5 could potentially result in the corner of the object 5 hitting the ground underneath, which in turn could results in damage to the object 5 and/or the holding tool 3. Therefore, if the geometry of the object 5 being moved is known, such occurrences may be taken into consideration and alleviated by the control unit 11, wherein the control unit 11 controls the driving means 9 to simultaneously perform a height adjusting movement as described above.

The driving means 9 may further be arranged to determine the mass of an object 5 when said object 5 is lifted a distance by means of the driving means 9 and the holding tool 3. As the mass of the ingoing parts of the device 1 is known, and the work performed by the driving means 9, with and without holding an object 5 may also easily be monitored, the difference of said work performed may easily be calculated wherein the result may be utilized to provide the mass of the object 5 being lifted. Such information may then be presented to an operator of the device 1 in a variety of ways, like for example the mass of a single object 5, the total mass lifted during a work shift, an average mass of a plurality of objects 5, the median mass on a plurality of objects 5, the total number of objects 5 that have been lifted, or other. Such data may prove useful for an owner and/or operator of the device 1.

According to another aspect of the disclosure, an agricultural vehicle 23 is provided, which vehicle 23 comprises a device 1 according to the invention. Said vehicle 23 may be a heavy working vehicle, such as a tractor or similar. The driving means 9 of the device 1 may in such cases be in the form of an implement commonly used for such vehicles. By mounting the device 1 to a vehicle 23, objects 5 being moved over large distances as well as being moved in height are easy to manage as the device 1 may easily be moved laterally by means of the vehicle 23.

Furthermore, a method for an agricultural device is also provided within the disclosure of the invention. The method is a method for semi-automatic movement of a holding tool 3, for holding an object 5, between two positions. The holding tool 3 is operatively connected to driving means 9 for moving the holding tool 3 up and down between a lowest point and a highest point, wherein the holding tool 3 is semi-automatically movable between four determined positions; an upper retrieval position URP, an upper placing position UPP, a lower retrieval positon LRP, and a lower placing position LPP, said four positions URP, UPP, LRP, LPP all being in a range between the lowest point and the highest point. Said method comprises the steps of: a) receiving, via a user interface 13, an input command comprising an up command or a down command, b) determining if the holding tool 3 holds an object 5, and c) automatically controlling the driving means 9 by means of the control unit 11. The various operations which may take place as a result of step c) are; —the driving means 9 moves the holding tool 3 to the upper retrieval position URP, when an up command is received by means of the user interface 13 and the holding tool 3 is not holding an object 5, —the driving means 9 moves the holding tool 3 to the upper placing position UPP, when an up command is received by means of the user interface 13 and the holding tool 3 holds an object 5, —the driving means 9 moves the holding tool 3 to the lower retrieval positon LRP, when a down command is received by means of the user interface 13 and the holding tool 3 is not holding an object 5, and the driving means 9 moves the holding tool 3 to the lower placing positon LPP, when a down command is received by means of the user interface 13 and the holding tool 3 holds an object 5. The method thereby provides fast and efficient semi-automatic movement of objects 5, well suited for repeated retrieval and placing of a plurality of objects 5.

The predetermined scheme may further comprise additional movements for specific situations. The predetermined scheme may comprise: —moving the holding tool 3 to the lower retrieval positon LRP, when a down command is received by means of the user interface 13, the holding tool 3 is holding an object 5, and is positioned at the lower placing position LPP. This may be beneficial as it may expand the predetermined scheme to further comprise a movement which may be used for a placing operation specifically.

The method may further comprise a step d) which is carried out simultaneously as step c), wherein when step c), wherein when step c) is automatically controlling the driving means (9) for moving the holding tool (3), and when a down command is received by means of the user interface (13) and the holding tool (3) holds an object (5), step d) comprises sensing of, during the movement of the holding tool (3), if the holding tool (3) is no longer supporting the same amount of load, wherein upon such a detection the control unit (11) is arranged to automatically stop the driving means (9).

The method may even further comprise a step e), which is carried out before step a), of determining the four determined positions URP, UPP, LRP, LPP, said step e) comprising; registering at least two set points, a first set point being calibrated to the lower retrieval position LRP, and a second set point being calibrated to one of the two upper positions URP, UPP, and calculating the remaining position(s) of the four positions URP, UPP, LRP, LPP based on the recorded set points. The method thereby comprises a step which makes setting up the four positions URP, UPP, LRP, LPP being used for multi-purpose movement of objects 5 a simple task, which assures high accuracy and reliability for the method.

As should be obvious for a person skilled in the art, the different examples of the device 1, the vehicle 23 and the method, and their individual parts described herein can be combined in various ways without deviating from the inventive concept or the scope of the protection set up by the enclosed patent claims. It should furthermore also be obvious that the device 1 and the method disclosed in the patent application are derived from the same inventive concept, wherein the disclosure of the device 1 might contain information which is relevant for the method also, and vice versa.

Hereinafter different embodiments and examples of the invention will be described associated with the enclosed drawings. Reference numbers are not to be viewed as restrictive in relation to the scope of the protection given by the patent claims, only as assistance in understanding the drawings and the various technical features of the invention.

As will be realized the invention can be modified in various ways without deviating from the scope of the claims, and aspects of the different embodiments may be combined to achieve a variety of combined technical features and embodiments. Hence, the drawings and the description thereto should be viewed as illustrative and not restrictive.

FIG. 1 shows a schematic illustration of a vehicle 23 in the form of a tractor 23' comprising a device 1 according to the invention. The device 1 is a device for semi-automatic movement of a holding tool 3, for holding an object 5, between two positions, said two positions being at different heights. The holding tool 3 in this example a gripping tool but other tools may also be possible to use without deviating from the disclosure of the invention, such as for example a tool used for a forklift or similar. The device 1 further comprises driving means 9 for moving the holding tool 3 up and down between a lowest point and a highest point, said lowest point and a highest point being defined by the movement restrictions of the driving means 9 and the ground, floor or ceiling or other objects which may hinder further movements of the holding tool 3. The driving means 9 in this example is a pivoting arm arrangement which is operated by means of hydraulic cylinders 19. Said arrangement and the hydraulics are schematically represented merely to illustrate the concept of the invention. Other types of driving means 9 are of course also possible to use depending on the application for which the device 1 is to be used. For a simple embodiment of the invention, the device 1 may be implemented to a forklift or similar. The driving means 9 of this exemplary embodiment is however, as should be obvious, pivotable about pivot shafts 25 of the pivoting arm arrangement, which enables movement up and down, back and forth and to pivot the holding tool 3 if desired. This will be expanded upon with reference to FIGS. 3a-d. The driving means 9 may be used in a first mode of operation wherein the pivoting arm arrangement and thus the holding tool 3 may be moved freely by means of the user interface 13. The user interface 13 may also be used to shift the control unit 11 and the driving means 9 to a second mode of operation to operate in the semi-automatic manner of the invention. As shown in FIG. 1, one of the hydraulic cylinders 19 of the driving means 9 further comprises load sensing means 7 in the form of a pressure sensor 21 situated in said hydraulic cylinder 19. Said load sensing means 7 is arranged to monitor the pressure within the hydraulic cylinder 19 which may be utilized for several functions. Firstly, the load sensing means 7 may monitor the pressure within the cylinder 19 wherein said measured pressure is evaluated in the control unit 11 where normal driving data is stored. As should be understood, the pressure will increase when the device 1 is used to lift and/or move a heavy object 5, which will directly affect the internal pressure. When an object 5 is held by the holding tool 3 and is moved downwards by means of the driving means 9, the pressure will exhibit a unexpected pressure drop if the object 5 touches an underneath surface, such as the ground or a shelf or similar. This pressure drop, being a deviation from normal operating variables, may then be used by the control unit 11 to determine that the object 5 is in contact with a surface below the object. When this situation occurs the control unit 11 stops the movement of the driving means 9. This may then also be used for calibration purposes if said surface corresponds to one of the retrieval positions URP, LRP, AURP, ALRP for an object 5. The load sensing means 7 may further also be utilized for a separate function even if the holding tool 3 is not holding an object 5. If the holding tool 3 is moved up or down and the internal pressure on the cylinder exhibits unexpected pressure variations, that is pressure variations which deviate from normal operating values, said pressure variations may be an indication that the holding tool 3 is touching an undesired surface wherein the control unit 11 stops the movement of the driving means 9. The load sensing means 7 may thereby also be used as a failsafe mechanism, which provides a safe and reliable device 1. The device 1 may further also comprise additional sensors and sensor means for determining the position of the driving means 9 and the holding tool 3 at any time, which information is stored and monitored by means of the control unit 11 and displayed by means of the user interface 13.

FIGS. 2a-d show schematic illustrations of a tractor 23' comprising a device 1 according to the invention, with the holding tool 3 in different positions. The different positions of the holding tool 3, displayed in the respective figures are; the lower retrieval position LRP in FIG. 2a, the lower placing position LPP in FIG. 2b, the upper retrieval position URP in FIG. 2c, and the upper placing position UPP in FIG. 2d. As is shown in the figures, these four positions LRP, LPP, URP, UPP are defined by their abutment to, or vicinity to, a ground surface 27 and a top surface 29 of a shelf 31. These positions LRP, LPP, URP, UPP are not absolute, but may be interchanged to other positions of different heights. Any two locations of separate heights, from where objects 5 are retrieved and being placed, may also be used, without deviating from the scope of the invention. The tractor 23', with the device 1 as shown in FIGS. 2a-d are all shown with the holding tool 3 holding an object 5 having an upright orientation. It should be obvious however that the holding tool 3 very well may be not holding an object 5 as well, whereas the object 5 shown is to exhibit the relationship between the individual positions LRP, LPP, URP, UPP, the object 5 and the surfaces 27, 29 where the object 5 is to be placed on or retrieved from.

The two retrieval positions LRP, URP are defined as the height of the holding tool 3, when aligned with the centre of mass of the object 5 standing on the surface 27, 29 where the holding tool 3 is about to retrieve said object 5. Hence, said retrieval positions LRP, URP may be changed if either the type of holding tool 3 or the size or type of object 5 is substituted. The two placing positions LPP, UPP are defined as the height of the holding tool 3, when aligned with the centre of mass of the object 5 when said object 5 is at a determined distance 15, 17 above the location where said objects 5 are placed when in rest. As for the retrieval positions LRP, URP, the placing positions LPP, UPP may also be changed if either the type of holding tool 3 or the size or type of object 5 is substituted. It should also be noted that the placing positions LPP, UPP thus are defined as the positions where objects 5 are in a state to be placed, not the position where they already are placed. The determined distances, being the first and second distances 15, 17 between the object 5 and the placement surfaces 27, 29 may be any suitable distance giving enough clearance to operate the device 1 in a safe enough manner. The distances 15, 17 may the same for the lower and the upper placing positions LPP, UPP but they may also have individual values if more suitable. Said distances 15, 17 may be predetermined wherein they are registered into the control unit 11 by means of the user interface 13. The placing positions LPP, UPP may in such cases be calculated directly when the retrieval positions LRP, URP are defined, as the placing and retrieval positions LPP, UPP, LRP, URP only differ in height. Said distances 15, 17 may also be defined and/or changed by a user if more suitable for the moving operation at hand. The device 1 may then be set to the second mode of operation wherein movement may be performed semi-automatically according to the predetermined scheme comprising the above four determined positions LPP, UPP, LRP, URP. An example of a series of movement operations where a plurality of objects 5 are to be retrieved at the upper retrieval position URP and placed at the lower retrieval position LRP is given below.

When calibrated and in the second mode of operation, the driving means 9 will move the holding tool 3 up to the upper retrieval position URP if the holding tool 3 is not holding an object 5 and an up command is given to the user interface 13. The holding tool 3 is thus aligned with and ready to pick up an object 5 placed at a location corresponding to the upper retrieval position URP. The object 5 is then gripped by the holding tool 5 and moved up to the upper placing position UPP as a means to be given free clearance to be moved from the shelf 31. As the holding tool 3 is holding an object 5 and an up command is given, the holding tool 3 will not move higher than the upper placing position UPP according to the predetermined scheme. The vehicle 23 may thereafter be operated to the location of the lower positions LRP, LPP where the object 5 is to be placed. When a down command is then given to the user interface 13 the driving means 9 will move down to the lower placing position LPP. After potential adjustments to the positioning of the object 5 a down command is again given to the user interface 13 wherein the driving means 9 moves down and places the object 5 at the lower retrieval position LRP. When the holding tool 3 has released the object 5, and an up command is given to the user interface 13, the driving means 9 will automatically move the holding tool 3 up to the upper retrieval position URP wherein the holding tool 3 is aligned with and ready to retrieve a next object 5. Therein a full cycle of retrieval and placing an object 5 is completed. As should be understood, such a cycle may be reversed to retrieve objects 5 from the lower retrieval position LRP and placing them on the upper retrieval position URP as well. A combination of placing and retrieving on and from both positions LRP, URP is of course also possible without deviating from the semi-automatic movement by means of the device 1 according to the invention.

FIGS. 3a-d show schematic illustrations of a tractor 23' comprising a device 1 according to the invention, with the holding tool 3 being in a second orientation and in different positions. The different positions of the holding tool in the second orientation, displayed in the respective figures are; the additional lower retrieval position ALRP in FIG. 3a, the additional lower placing position ALPP in FIG. 3b, the additional upper retrieval position AURP in FIG. 3c, and the additional upper placing position AUPP in FIG. 3d. The four additional positions ALRP, ALPP, AURP, AUPP are coupled to each other in the same way as the four positions LRP, LPP, URP, UPP of FIGS. 2a-d, wherein the holding tool 3, when in the second orientation as shown in FIGS. 3a-d function in the same manner in regards to commands given to the user interface 13 and if the holding tool 3 is holding an object 5 or not. The difference between the cases depicted in FIGS. 2a-d and FIGS. 3a-d are that the holding tool 3 is in the second orientation, wherein it is holding an object 5 from above instead of from the side, and that the object 5 is oriented as if lying down. The height of the holding tool 3 in the second orientation is herein defined being at the height of the pivot shaft 25 between the holding tool 3 and the driving means 9. However, as should be obvious said height of said four additional positions ALRP, ALPP, AURP, AUPP may be defined as another part of the holding tool 3, as for example the lowermost portion of said tool 3 (this is of course also a possibility for the holding tool 3 as displayed in FIGS. 2*a-d*). The important factor for the height of the positions ALRP, ALPP, AURP, AUPP is their height relating to each other and the object 5 in relation to underlying surfaces 27, 29. When in this second orientation, the holding tool 3 is operated by means of the driving means 9 and the control unit 11 to work according to an additional predetermined scheme. As stated, said additional predetermined scheme functions in a similar manner as the predetermined scheme comprising the four positions LRP, LPP, URP, UPP with reference to FIGS. 2*a-d*, only using the four additional positions ALRP, ALPP, AURP, AUPP and having the holding tool 3 in the second orientation instead. To achieve this situation, when starting from any position as shown in FIGS. 2*a-d*, the holding tool 3 may be manually pivoted when in the first mode of operation, or when in the second mode of operation, an orientation change command may be given to the user interface 13. Said two orientations with their respective working orientations may thereby easily be interchanged.

Furthermore, the device 1 may also use a third predetermined scheme which uses the four positions LRP, LPP, URP, UPP shown in FIGS. 2*a-d* and the four additional positions ALRP, ALPP, AURP, AUPP shown in FIGS. 3*a-d* in combination. For the device 1 to be used in the third predetermined scheme the holding tool 3 is calibrated to the positions needed in the respective orientations wherein said orientation thereafter may be interchanged back and forth as needed according to the third predetermined scheme. By working according to this third predetermined scheme the device 1 may retrieve an object 5 lying down and place the object standing up, or vice versa, in an easy manner. Objects 5 of varying orientation may also be retrieved and still easily be placed in the same orientation by means of the device 1. This may be performed in several ways by means of the user interface 13 and the control unit 11. If an object 5 is retrieved in one orientation and is desired to be pivoted to the other orientation, an orientation change command may simply be given to the user interface 13. In such cases the control 11 unit will pivot the holding tool 3 and perform a height adjusting movement to reflect the height difference which may be present between the two orientations of both the holding tool 3 and the object 5. The control unit 11 and the user interface 13 may also further have the functionality to semi-automatically move the holding tool 3 from one position to another while at the same time changing orientation. This may be presented in the user interface 13 in different manners. The user interface 13 may have an easy to use modifying option wherein an up command is modified to an up and change orientation command. An example of this is that the user interface 13 may have a joystick, wherein said joystick comprises a modifying button which is easy to press at the same time as moving the joystick upwards. Hence, only moving the joystick upwards would perform an up command whereas holding the modifying button pressed down while moving the joystick up would perform an up command and an orientation change at the same time. The user interface 13 may also comprise two separate joysticks wherein one performs up commands and the other performs both an up command and an orientation change command simultaneously. The user interface 13 comprising a joystick is however merely an example and the user interface 13 may instead comprise only buttons or other, wherein the concept may remain the same as presented in the example comprising said joystick. Another option is to have a desired amount of positons presented by individual buttons or similar as well, wherein the buttons functions as go to levels individually. Whichever manner the user interface 13 is presenting the movement options in, the device 1 is fast and easy to calibrate and may then be used for a variety of semi-automatic movements related to retrieving and placing objects in a very precise, safe and easy to use way. Such a semi-automatic movement as described with accordance to the third predetermined scheme is ideal to use for examples for moving bales of harvested crop, wherein the orientation of said bales may vary when situated on a field from where they are to be retrieved.

Figure 4:
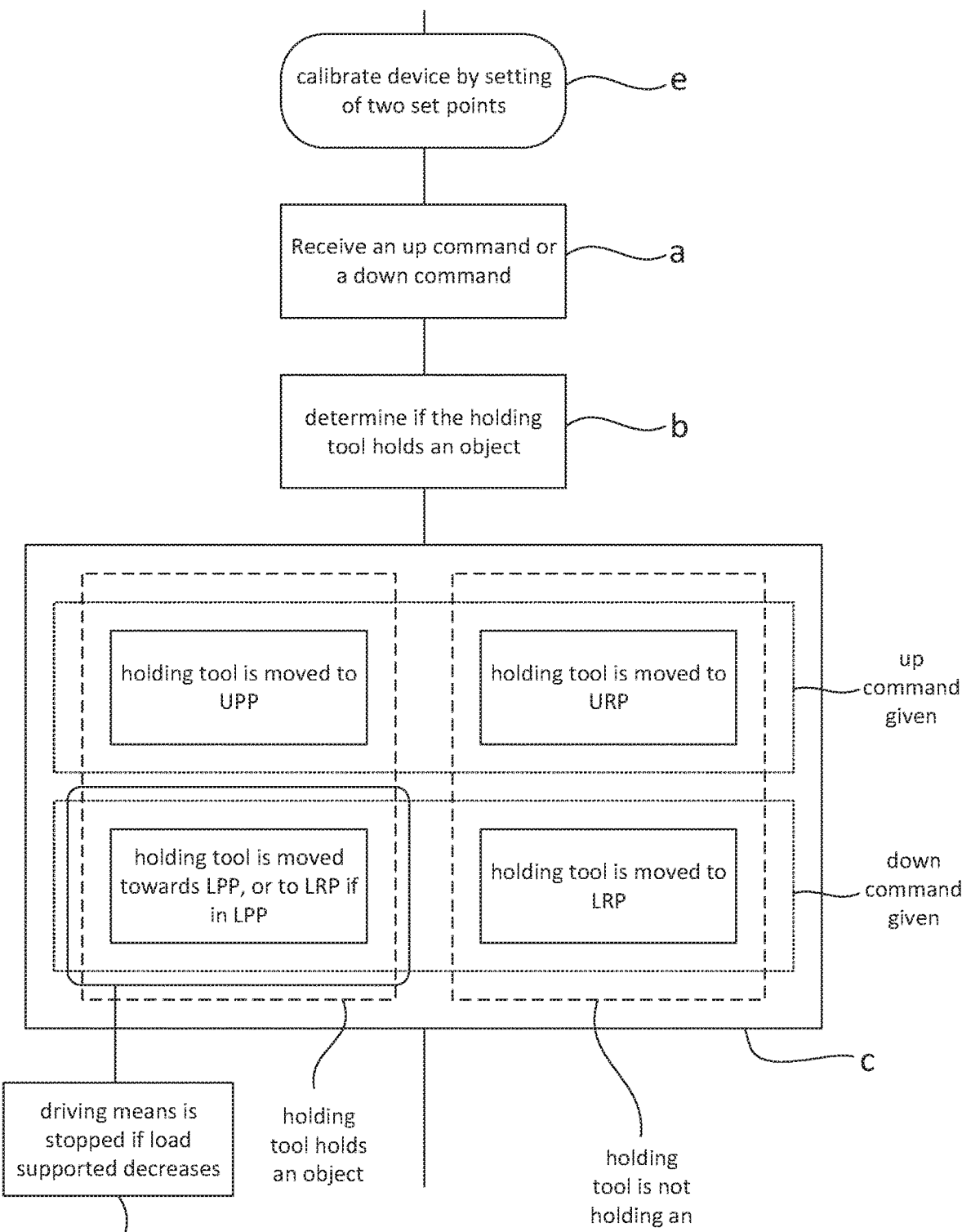
FIG. 4 shows a flowchart of a method for semi-automatic movement of a holding tool according to the invention.

FIG. 4 shows a flowchart of a method for semi-automatic movement of a holding tool 3 according to the invention. The method shown in FIG. 4 comprises the steps of; e) registering at least two set points, a first set point being calibrated to the lower retrieval position LRP, and a second set point being calibrated to one of the two upper positions URP, UPP, and calculating the remaining position(s) of the four positions URP, UPP, LRP, LPP based on the recorded set points, a) receiving, via a user interface 13, an input command comprising an up command or a down command, b) determining if the holding tool 3 holds an object 5, c) automatically controlling the driving means 9 by means of the control unit 11, and d) sensing of, during the movement of the holding tool (3), if the holding tool (3) is no longer supporting the same amount of load, wherein upon such a detection the control unit (11) is arranged to automatically stop the driving means (9). (As should be obvious, the step d) simultaneously functions as a failsafe mechanism for detecting if the holding tool 3, when not holding an object 5, abuts any external surface, as described with reference to the device 1 according to the invention.) The automatic movement which is a result of step c) is determined and performed according to the following movement scheme;
—The driving means 9 moves the holding tool 3 to the upper retrieval position URP, when an up command is received by means of the user interface 13 and the holding tool 3 is not holding an object 5. —The driving means 9 moves the holding tool 3 to the upper placing position UPP, when an up command is received by means of the user interface 13 and the holding tool 3 holds an object 5. —The driving means 9 moves the holding tool 3 to the lower retrieval positon LRP, when a down command is received by means of the user interface 13 and the holding tool 3 is not holding an object 5. —The driving means 9 moves the holding tool 3 to the lower placing positon LPP, when a down command is received by means of the user interface 13 and the holding tool 3 holds an object 5. —The driving means 9 moves the holding tool 3 to the lower retrieval positon LRP, when a down command is received by means of the user interface 13, the holding tool 3 holds an object 5, and the holding tool is in the lower placing position LPP.

As should be obvious, the method may be modified in a variety of ways echoing the various embodiments and examples presented with reference to the device 1 according to the invention, as both the device 1 and the method according to the invention are designed to provide semi-automatic movement of objects 5 between positions of different heights, preferably for repeated such movement of a plurality of objects 5.

Figure 5:
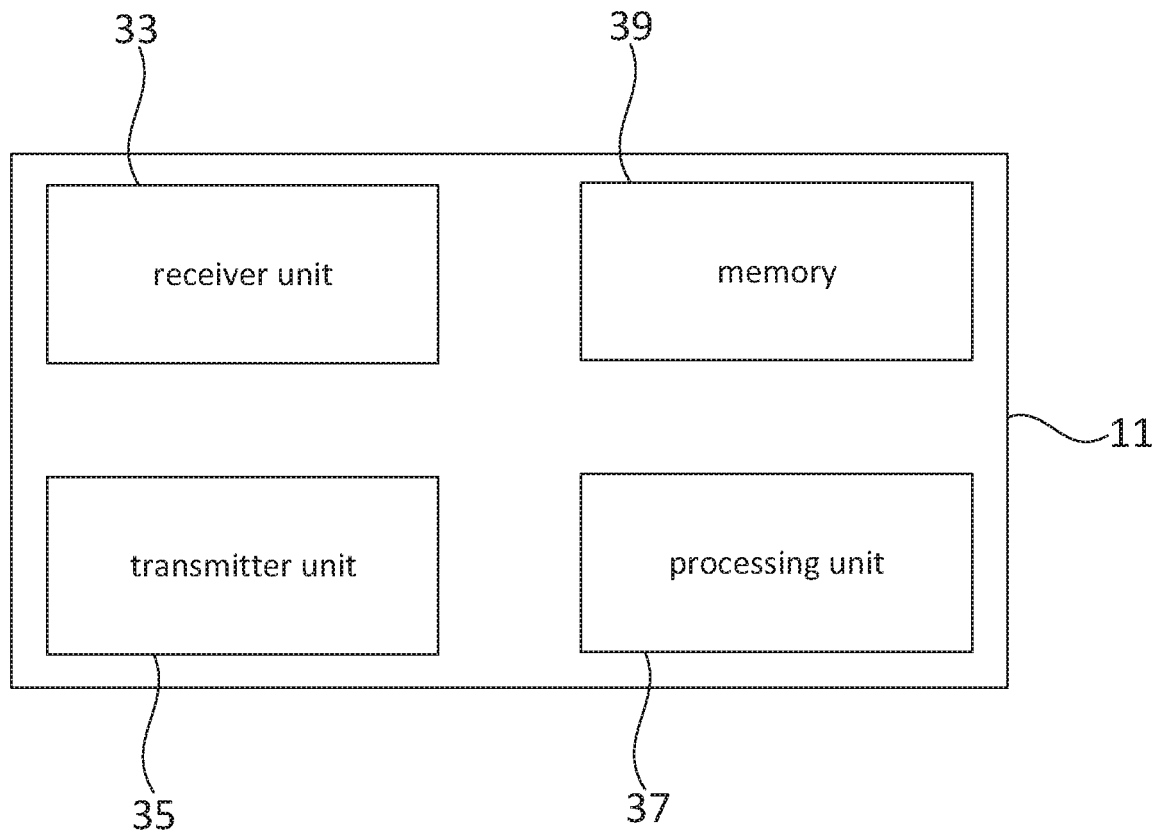
FIG. 5 shows a control unit arranged to control semi-automatic movement of a holding tool.

FIG. 5 shows a control unit 11 arranged to control semi-automatic movement of a holding tool 3, for holding an object 5, between two positions, wherein the holding tool 3 is operatively connected to driving means 9 for moving the holding tool 3 up and down between a lowest point and a highest point, and wherein the holding tool 3 is semi-automatically movable between four determined positions; an upper retrieval position (URP), an upper placing position (UPP), a lower retrieval positon (LRP), and a lower placing position (LPP), said four positions (URP, UPP, LRP, LPP) all being in a range between the lowest point and the highest point. The control unit 11 is arranged to receive a user input command comprising an up command or a down command, determine if the holding tool 3 holds an object 5, and automatically controlling the driving means 9. The control unit 11 is arranged to control the driving means 9 to move the holding tool 3 to the upper retrieval position (URP), when an up user command is received and the holding tool 3 is not holding an object 5. The control unit 11 is arranged to control the driving means 9 to move the holding tool 3 to the upper placing position (UPP), when an up user command is received and the holding tool 3 holds an object 5. The control unit 11 is arranges to control the driving means 9 to move the holding tool 3 to the lower retrieval positon (LRP), when a down user command is received and the holding tool 3 is not holding an object 5. The driving means 9 is arranged to move the holding tool 3 to the lower placing positon (LPP), when a down user command is received and the holding tool 3 holds an object 5.

The control unit 11 may be a single unit or a distributed function.

The control unit 11 comprises a receiver unit 33, a transmitter unit 35, a processing unit 37 and memory 39 or memories 39. Program code for executing the tasks of the control unit is stored in the memory 39 or memories 39. Furthermore, the memory 39 can store user input commands and other sensor input.

Sensor signals relating to whether the holding tool 3 holds an object 5 or not are received by means of the receiver unit 33. Furthermore, the user input is received by means of the receiver unit 33. The transmitter unit 35 is arranged to transmit the control signals to the driving means 9.

As should be obvious for a person skilled in the art, the different examples of the mounting device and its individual parts described herein can be combined in various ways without deviating from the inventive concept or the scope of the protection set up by the enclosed patent claims.

We claim:

1. An agricultural device for semi-automatic movement of a holding tool, for holding an object, between two positions, said two positions being at different heights, the device comprising;
    said holding tool for holding the object,
    load sensing means for determining if the holding tool holds an object, driving means for moving the holding tool up and down between a lowest point and a highest point,
        a control unit for controlling the driving means, and
        a user interface for user input to the control unit,
    the device can be used in two modes of operations, wherein the holding tool in a first mode of operation is freely movably between the lowest point and the highest point by means of user input via the user interface, and in a second mode of operation is semi-automatically movable between a plurality of determined positions within a range between the lowest and highest point,
    wherein:
        in the second mode of operation, the control unit is arranged to control the driving means for moving the holding tool in accordance with a predetermined scheme comprising four determined positions, wherein said predetermined scheme comprises;
            moving the holding tool to an upper retrieval position (URP), when an up command is received by means of the user interface and the holding tool is not holding an object,
            moving the holding tool to an upper placing position (UPP), when an up command is received by means of the user interface and the holding tool holds an object,
            moving the holding tool to a lower retrieval positon (LRP), when a down command is received by means of the user interface and the holding tool is not holding an object, and
            moving the holding tool to a lower placing positon (LPP), when a down command is received by means of the user interface and the holding tool holds an object, and
    that when a down command is received by means of the user interface and the holding tool holds an object, the load sensing means is during the movement arranged to detect if the holding tool is no longer supporting the same amount of load, wherein upon such a detection, the control unit is arranged to automatically stop the driving means.

2. The device (1) according to claim 1, wherein the device (1) comprises a calibration unit for determining the four determined positions (URP, UPP, LRP, LPP), said calibration unit being arranged to register at least two set points, a first set point being calibrated to the lower retrieval position (LRP), and a second set point being calibrated to one of the two upper positions (URP, UPP), and to calculate the remaining position(s) of the four determined positions (URP, UPP, LRP, LPP).

3. The device according to claim 1, wherein the load sensing means is arranged to utilize variations of driving variables within the driving means to detect whether the holding tool holds an object or not.

4. The device according to claim 3, wherein the driving means comprises hydraulics, wherein the variations of driving variables within the driving means are pressure variations within at least one hydraulic cylinder.

5. The device according to claim 1, wherein the holding tool is pivotable to a second orientation, so as to also be able to grip the object from said second orientation.

6. The device according to claim 5, wherein the device is semi-automatically movable between four additional positions, said four additional positions all being in a range between the lowest point and the highest point, wherein the four additional positions are defined based on the holding tool being in the second orientation, wherein in the second mode of operation, the control unit is arranged to control the driving means for moving the holding tool in accordance with an additional predetermined scheme, wherein said additional predetermined scheme comprises;
    moving the holding tool to an additional upper retrieval position (AURP), when an up command is received by means of the user interface and the holding tool is not holding an object,
    moving the holding tool to an additional upper placing position (AUPP), when an up command is received by means of the user interface and the holding tool holds an object,
    moving the holding tool to an additional lower retrieval positon (ALRP), when a down command is received by means of the user interface and the holding tool is not holding an object, and
    moving the holding tool to an additional lower placing positon (ALPP), when a down command is received by means of the user interface and the holding tool holds an object.

7. The device according to claim 6, wherein the calibration unit can determine the four additional determined positions (AURP, AUPP, ALRP, ALPP), said calibration unit being arranged to register at least two additional set points, a first additional set point being calibrated to the additional lower retrieval position (ALRP), and a second additional set point being calibrated to one of the two additional upper positions (AURP, AUPP), and to calculate the remaining positions of the four additional determined positions (AURP, AUPP, ALRP, ALPP).

8. The device according to claim 6, wherein the holding tool is arranged to alter between the two orientations by inputting an orientation change command by means of the user interface.

9. The device according to claim 6, wherein the control unit is arranged to control the driving means for moving the holding tool in accordance with a third predetermined scheme, wherein the third predetermined scheme comprises a combination of the predetermined scheme and the additional predetermined scheme and their determined positions (URP, UPP, LRP, LPP, AURP, AUPP, ALRP, ALPP) respectively.

10. The device according to claim 6, wherein the driving means automatically will perform a height adjusting movement of the holding tool when the orientation of the holding tool is changed, the height adjusting movement corresponding to a height difference defined as the difference in height of the holding tool when in the lower retrieval positon (LRP) and the additional lower retrieval positon (ALRP).

11. The device according to claim 1, wherein the driving means is arranged to determine the mass of an object when said object is lifted a distance by means of the driving means.

12. An agricultural vehicle, comprising a device according to claim 1.

13. A method, for an agricultural device, for semi-automatic movement of a holding tool, for holding an object, between two positions, wherein the holding tool is operatively connected to driving means for moving the holding tool up and down between a lowest point and a highest point, and wherein the holding tool is semi-automatically movable between four determined positions; an upper retrieval position (URP), an upper placing position (UPP), a lower retrieval positon (LRP), and a lower placing position (LPP), said four positions (URP, UPP, LRP, LPP) all being in a range between the lowest point and the highest point, said method comprising the steps of:
 a) receiving, via a user interface, an input command comprising an up command or a down command
 b) determining if the holding tool holds an object and
 c) automatically controlling the driving means by means of the control unit, wherein;
   the driving means moves the holding tool to the upper retrieval position (URP), when an up command is received by means of the user interface and the holding tool is not holding an object,
   the driving means moves the holding tool to the upper placing position (UPP), when an up command is received by means of the user interface and the holding tool holds an object,
   the driving means moves the holding tool to the lower retrieval positon (LRP), when a down command is received by means of the user interface and the holding tool is not holding an object,
   the driving means moves the holding tool to the lower placing positon (LPP), when a down command is received by means of the user interface and the holding tool holds an object, and
 d) which is carried out simultaneously as step c), wherein when step c) is automatically controlling the driving means for moving the holding tool, and when a down command is received by means of the user interface and the holding tool holds an object, step d) comprises sensing of, during the movement of the holding tool, if the holding tool is no longer supporting the same amount of load, wherein upon such a detection the control unit is arranged to automatically stop the driving means.

14. The method according to claim 13, wherein the method comprises a step e), which is carried out before step a), of determining the four determined positions (URP, UPP, LRP, LPP), said step e) comprising; registering at least two set points, a first set point being calibrated to the lower retrieval position (LRP), and a second set point being calibrated to one of the two upper positions (URP, UPP), and calculating the remaining position(s) of the four positions (URP, UPP, LRP, LPP) based on the recorded set points.

15. Software for obtaining information related to driving means, said software being adapted to perform the method according to claim 13.

* * * * *